United States Patent
Gupta

(10) Patent No.: US 11,396,863 B2
(45) Date of Patent: Jul. 26, 2022

(54) MESSAGING TO INDICATE TONAL NOISE

(71) Applicant: VESTAS WIND SYSTEMS A/S, Aarhus N (DK)

(72) Inventor: Mranal Gupta, Tilst (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 52 days.

(21) Appl. No.: 16/959,135

(22) PCT Filed: Dec. 14, 2018

(86) PCT No.: PCT/DK2018/050364
§ 371 (c)(1),
(2) Date: Jun. 29, 2020

(87) PCT Pub. No.: WO2019/129332
PCT Pub. Date: Jul. 4, 2019

(65) Prior Publication Data
US 2020/0332768 A1    Oct. 22, 2020

(30) Foreign Application Priority Data

Dec. 29, 2017 (DK) .......................... PA 2017 71035

(51) Int. Cl.
*F03D 7/04* (2006.01)
*F03D 7/02* (2006.01)
*F03D 17/00* (2016.01)

(52) U.S. Cl.
CPC ........... *F03D 7/0296* (2013.01); *F03D 7/048* (2013.01); *F03D 17/00* (2016.05)

(58) Field of Classification Search
None
See application file for complete search history.

(56) References Cited

U.S. PATENT DOCUMENTS

| | | | |
|---|---|---|---|
| 11,105,316 B2 * | 8/2021 | Gupta | F03D 80/60 |
| 2010/0135798 A1 | 6/2010 | Eggleston | |
| 2015/0115610 A1 | 4/2015 | Quinlan et al. | |
| 2019/0271295 A1 * | 9/2019 | Gupta | F03D 7/0296 |
| 2020/0182224 A1 * | 6/2020 | Gupta | F03D 7/0296 |

FOREIGN PATENT DOCUMENTS

| | | |
|---|---|---|
| DE | 102015008812 A1 | 1/2017 |
| WO | 2013023660 A1 | 2/2013 |

(Continued)

OTHER PUBLICATIONS

Danish Patent and Trademark Office, First Technical Examination of Patent Application: PA 2017 71035, dated Jul. 5, 2018.

(Continued)

*Primary Examiner* — Michael Lebentritt
(74) *Attorney, Agent, or Firm* — Patterson + Sheridan, LLP

(57) ABSTRACT

A method of monitoring wind turbine emission of tonal noise is provided. The method comprises receiving a noise notification as a message from a third party, determining a time associated with the message, and acquiring sensor data from a sensor, with the sensor data being indicative of an operating parameter of a wind turbine. The method further comprises correlating the noise notification with the acquired sensor data based on the time associated with the message.

19 Claims, 8 Drawing Sheets

(56) References Cited

FOREIGN PATENT DOCUMENTS

WO    2017198270 A1    11/2017
WO    2019129332 A1    7/2019

OTHER PUBLICATIONS

Danish Patent and Trademark Office—Search Opinion, Application: PA 2017 71035, dated Jul. 5, 2018.
Danish Patent and Trademark Office—Search Report-Patent, Application: PA 2017 71035, dated Jul. 5, 2018.
PCT, Written Opinion of the International Searching Authority, Application: PCT/DK2018/050364, dated Jul. 5, 2018.
PCT, International Search Report, Application: PCT/DK2018/050364, dated Jul. 5, 2018.

* cited by examiner

MESSAGING TO INDICATE TONAL NOISE

TECHNICAL FIELD

The application relates to a method for determining when turbine tonal noise emission is occurring.

BACKGROUND ART

FIG. 1 illustrates a wind turbine 101 known in the art, comprising a tapered tower 102, which is subdivided into a number of tower sections 106. A wind turbine nacelle 103 is positioned on top of the tower 102. The wind turbine rotor 104, comprising a number of wind turbine blades 105, is connected to the nacelle 103 through the low speed shaft which extends out of the nacelle 103 front.

Typically a tower section 106 comprises a number of tower rings welded together during the making of the section 106, where each section typically at each end comprises a connection flange for connecting the tower sections 106 to each other at the site to form a complete tower 102. The tower sections 106 can theoretically be up to more than 50 or 60 meters long but in practice they are seldom more than 35 meters long so that they can be transported on existing road systems.

In this example the tower 102 comprises a top section 112 on top of five other tower sections 106, but the tower 102 could comprise more or fewer tower sections 106 depending on the total height of the tower 102, the type of wind turbine 101, the weight of the nacelle 103 and rotor 104, the maximum transportable length, or other factors, FIG. 2 illustrates a simplified cross section of a nacelle 203 of a typical wind turbine 101, as seen from the side. Nacelles 203 exist in a multitude of variations and configurations but in most cases the drive train in the nacelle 203 comprises one or more of the following components: a gearbox 215, a coupling (not shown), some sort of breaking system 216 and a generator 217. A nacelle 203 of a modern wind turbine 101 can also include a converter 218 (also called an inverter) and additional peripheral equipment such as further power handling equipment, control cabinets, hydraulic systems, cooling systems and more.

The weight of the entire nacelle 203 including the nacelle components 215, 216, 217, 218 is carried by a nacelle structure 219, sometimes referred to as a base-plate. The components 215, 216, 217, 218 are usually placed on and/or connected to this common load carrying nacelle structure 219. In this simplified embodiment the load carrying nacelle structure 219 only extends along the bottom of the nacelle 203 e.g. in form of a bed frame to which some or all the components 215, 216, 217, 218 are connected. In another embodiment the load carrying structure 219 could comprise a gear bell which, through the main bearing, could transfer the load of the rotor 204 to the tower 202, or the load carrying structure 219 could comprise several interconnected parts such as latticework.

At the bottom of the nacelle 203 the wind turbine 101 may be provided with a yaw mechanism 214 fitted in the joint between the tower 202 and the nacelle 203. The yaw mechanism 214 could comprise some kind of toothed slewing bearing actuated by some kind of motor driven pinion.

A wind turbine known in the art comprises a tapered wind turbine tower and a wind turbine nacelle positioned on top of the tower. A rotor with a number of blades is connected to the nacelle through a low speed shaft, which extends out of the nacelle front as illustrated on FIG. 1.

Noise emission from wind turbines is a well-known problem and has been the subject of extensive work. The procedure for measuring wind turbine acoustic noise is described in the third edition of international standard IEC 61400-11. Noise emission can be a serious problem, in particular for land based turbines. The more noise the operating wind turbine generates the more remotely it has to be sited from homes and population centres.

The noise emission from a wind turbine includes both mechanical noise and aerodynamic noise. Mechanical noise includes noise driven by components within the nacelle, such as the wind turbine drivetrain. Such noise can be radiated to the surroundings directly from the surface of vibrating components (so-called airborne noise) or can be radiated to the surroundings by the wind turbine tower or blades when vibrations of components are conducted through the structure of the wind turbine (so-called structure borne noise (SBN)). Aerodynamic noise comes from the wind turbine blades and includes, for example, noise due to vortex-shedding.

The spectrum of noise produced by a wind turbine includes both broadband noise and noise at distinct frequencies. Noise at distinct frequencies, known as tonal noise, is often perceived as more annoying to wind turbine neighbours and is more likely to be the subject of noise complaints. Unfortunately, it is difficult to predict when a wind turbine will produce tonal noise and when tonal noise will be audible to wind turbine neighbours, as this can depend on a wide variety of factors.

SUMMARY OF THE INVENTION

The invention is defined in the independent claims to which reference should now be made. Advantageous features are set out in the dependent claims.

According to a first aspect of the present invention, there is provided a method for monitoring wind turbine tonal noise. The method comprises: receiving, over a communications network, a noise notification method from a third party; determining a time associated with the message; acquiring sensor data from at least one sensor, the sensor data being indicative of at least one operating parameter of at least on wind turbine; and correlating the noise notification with the acquired sensor data based on the time associated with the message.

This provides further information relating to the emission of tonal noise by wind turbines. Further, as the reason for trying to reduce tonal noise emission primarily lies in reducing the nuisance to neighbours, having third parties, including neighbours, send a noise notification method when the noise levels of wind turbines are annoying gives a good indication of when tonal noise is occurring.

Optionally, the method further comprises comparing the acquired sensor data with previously acquired sensor data, determining changes in the acquired sensor data from the previously acquired sensor data, and determining, based upon any changes in the acquired sensor data, whether tonal noise is being generated by the at least one wind turbine.

Optionally, the method further comprises comparing the acquired sensor data with one or more predetermined tonal noise operational envelopes for the one or more wind turbines, the operational envelopes corresponding to a range of operating parameters that cause the one or more wind turbines to emit tonal noise, and determining, based upon the comparison whether the noise notification corresponds to tonal noise being generated by the at least one wind turbine.

These steps are advantageous as it may be the case that a third party is mistaken in thinking that a noise that is disturbing them originated from a wind turbine, when in actual fact the noise may be originating from another source. The above steps therefore allow it to be ascertained that the noise disturbing the third party is in fact tonal noise being emitted by at least one of the wind turbines.

Optionally, the at least one turbine comprises two or more turbines, wherein the acquired sensor data includes data specific to individual wind turbines; and wherein the correlating of the noise notification with the acquired sensor data allows at least one turbine of the two or more turbines to be identified as a source of tonal noise.

By identifying individual wind turbines that are generating tonal noise, the parameters of these specific turbines can be adjusted to reduce tonal noise emission. As the reducing of tonal noise emission this way often leads to a reduction in power output, it is advantageous to be able to identify the specific wind turbines to adjust the parameters of, rather than having to adjust the parameters of all of the turbines in the wind power plant, as the power output of the turbines as a whole does not then have to be reduced, resulting in higher power production.

Optionally, the at least one sensor enters a data acquiring state for a predetermined period of time upon receiving a noise notification.

Optionally, sensor data is acquired continually/sensor data acquisition is ongoing, wherein if a noise notification is received, the acquired sensor data relating to a predetermined period before the noise notification was received is stored.

Optionally, sensor data is acquired and stored for a predetermined period of time after the noise notification is received.

Such a method allows for sensor data to be collected from before, during and after a tonal noise event, without having to store unnecessary amounts of data. This would both allow the identification of ranges of operating parameters and environmental conditions that correspond to tonal noise emission, as well as how the parameters and conditions vary in the lead up to a tonal noise event. As such, it may be possible to predict when turbines may start emitting tonal noise and adjust the operating parameters of the turbines pre-emptively thus avoiding tonal noise emission all together.

Optionally, the noise notification message contains location information relating to the location from which the noise notification was sent.

It is known that tonal noise is directional, and the location where tonal noise can be heard can depend on factors such as geography and wind direction. By being able to identify the location where tonal noise is a problem, it can be identified what operating parameter ranges give rise to tonal noise in different locations.

Optionally, the noise notification message is an SMS/MMS, a text or e-mail message sent over the internet, or a combination thereof.

Optionally, the at least one sensor includes a vibration sensor, and the sensor data includes vibration data.

Optionally, the at least one sensor senses rotor RPM, and the sensor data includes rotor RPM data.

Optionally, the at least one sensor senses blade pitch, and the sensor data includes blade pitch data.

Optionally, the at least one sensor senses turbine power, and the sensor data includes turbine power production.

Optionally, the at least one sensor includes a wind speed sensor, and the sensor data includes wind speed data.

Optionally, the at least one sensor includes a wind direction sensor, and the sensor data includes wind direction data.

Optionally, the method further comprises, if it is determined that one or more of the at least one wind turbines is emitting tonal noise, adjusting one or more wind turbine operating parameters of one or more of the at least one wind turbines so as to reduce tonal noise emission.

Optionally, the method further comprises, if it is determined that one or more of the at least one wind turbines is emitting tonal noise, adjusting one or more wind turbine operating parameters of one or more of the at least one wind turbines so as to mask tonal noise emission.

Optionally, the method further comprises: comparing the acquired sensor data with one or more predetermined tonal noise operational envelopes for the one or more wind turbines. The operational envelopes correspond to a range of operating parameters that cause the one or more wind turbines to emit tonal noise. When it is determined that a turbine is operating within one of the predetermined tonal noise operational envelopes, information indicative of the wind turbine identity and a time associated with the operation of the wind turbine within the operational envelope is determined. The information is then correlated with one or more received third party messages. The determined information indicative of the wind turbine identity and a time associated with likely tonal operation can be sent via a message to the system in the same manner as described in relation to the third party messages. This part of the method may therefore be performed by a sub-system that is separate to the system implementing the receipt and correlation of third party messages. Alternatively, a single integrated system may be used which could pass the information internally without sending such a message.

A second aspect of the present invention includes a system comprising a receiver which is configured to receive a noise notification message, at least one sensor which is configured to acquire data indicative of at least one operating parameter of at least one wind turbine, and a computing device which is configured to correlate the acquired sensor data with the received noise notification message.

A third aspect of the present invention is to provide a computer program which when executed on a computing device causes it to carry out the method of the first aspect.

BRIEF DESCRIPTION OF THE DRAWINGS

One or more embodiments of the invention will now be described with reference to the following figures in which.

DETAILED DESCRIPTION OF THE PREFERRED EMBODIMENTS

Figure 1:
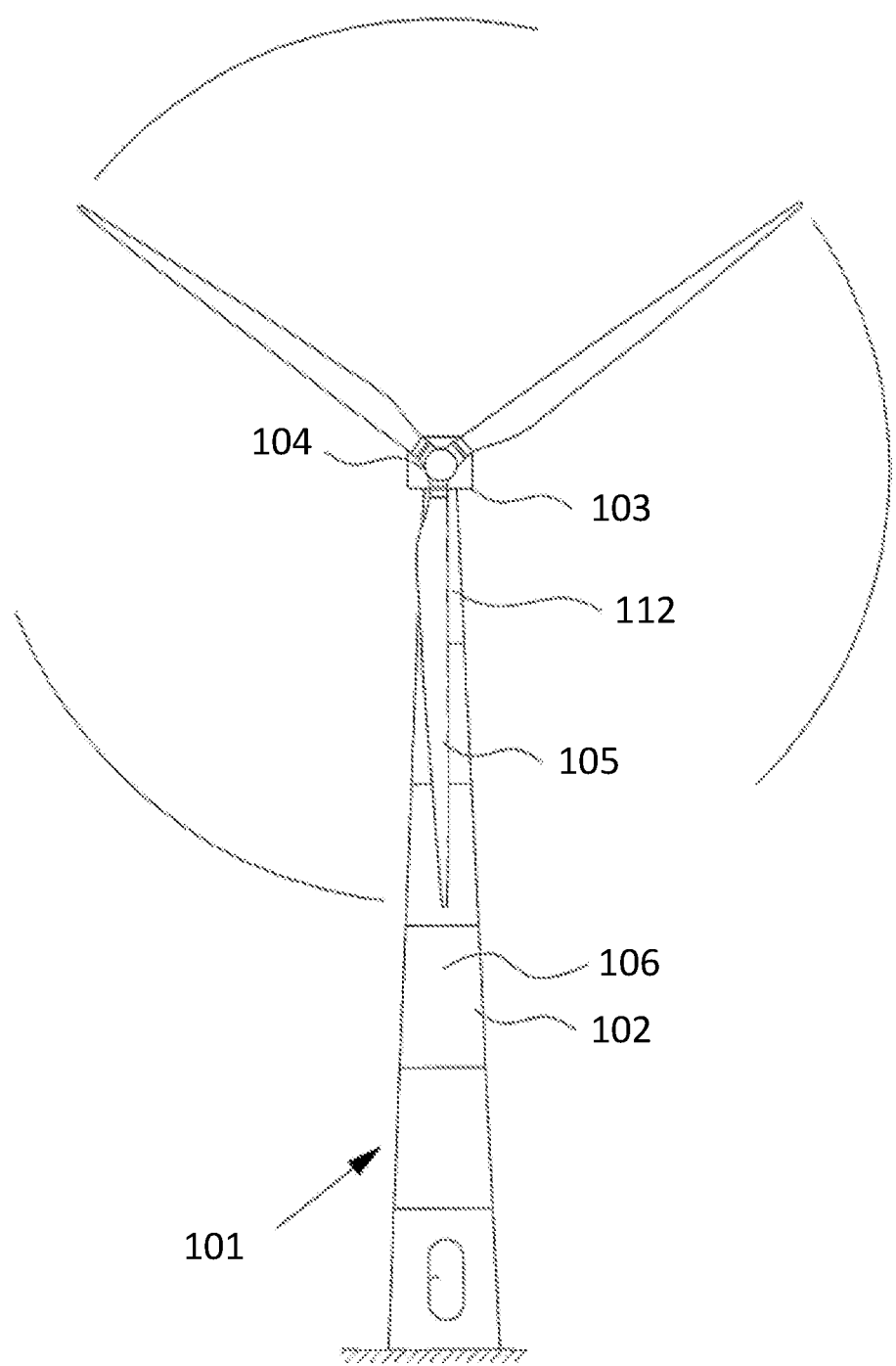
FIG. 1. illustrates a large modern wind turbine known in the art, as seen from the front.
Figure 2:
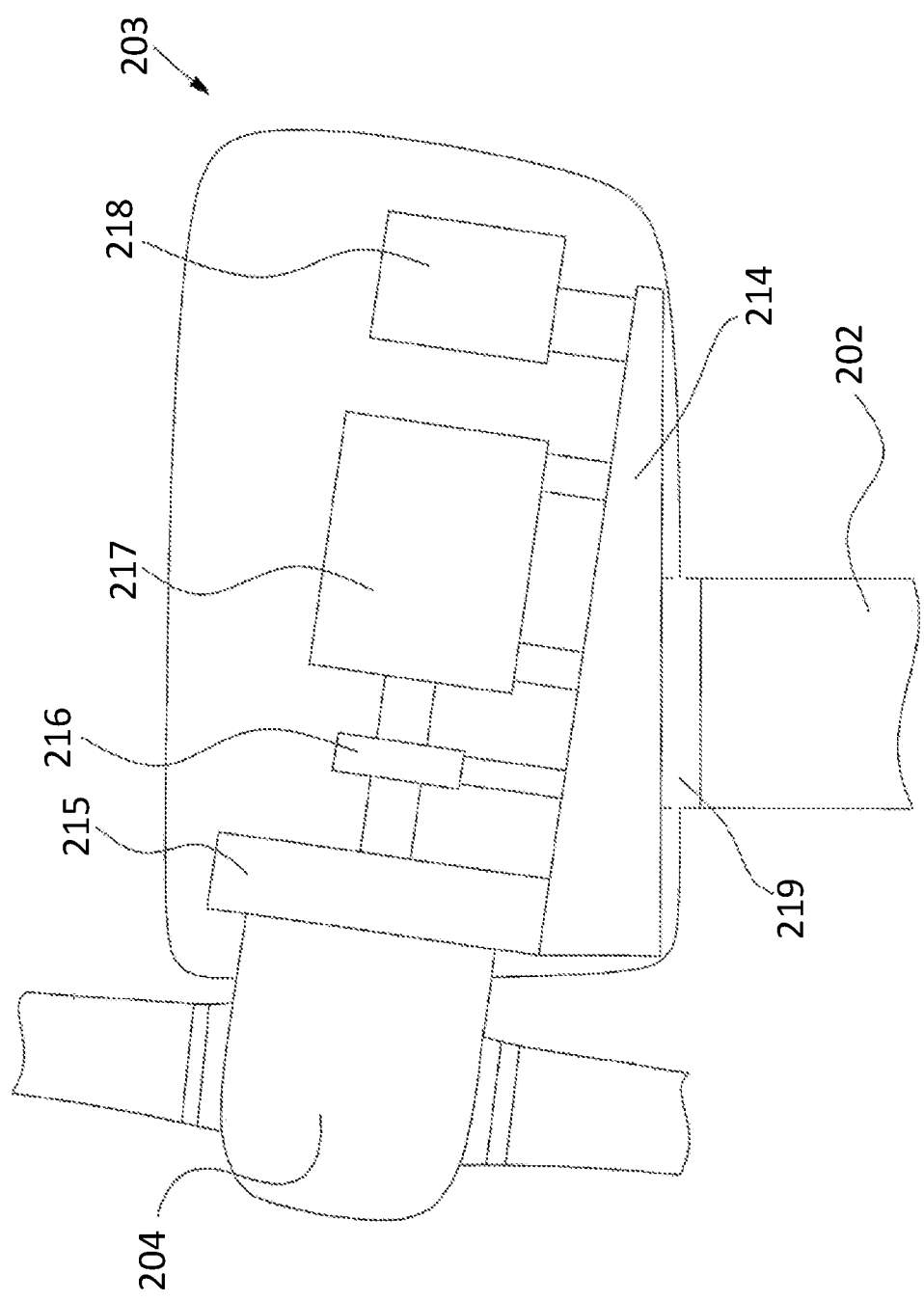
FIG. 2 illustrates a simplified cross section of a nacelle, as seen from the side.
Figure 3:
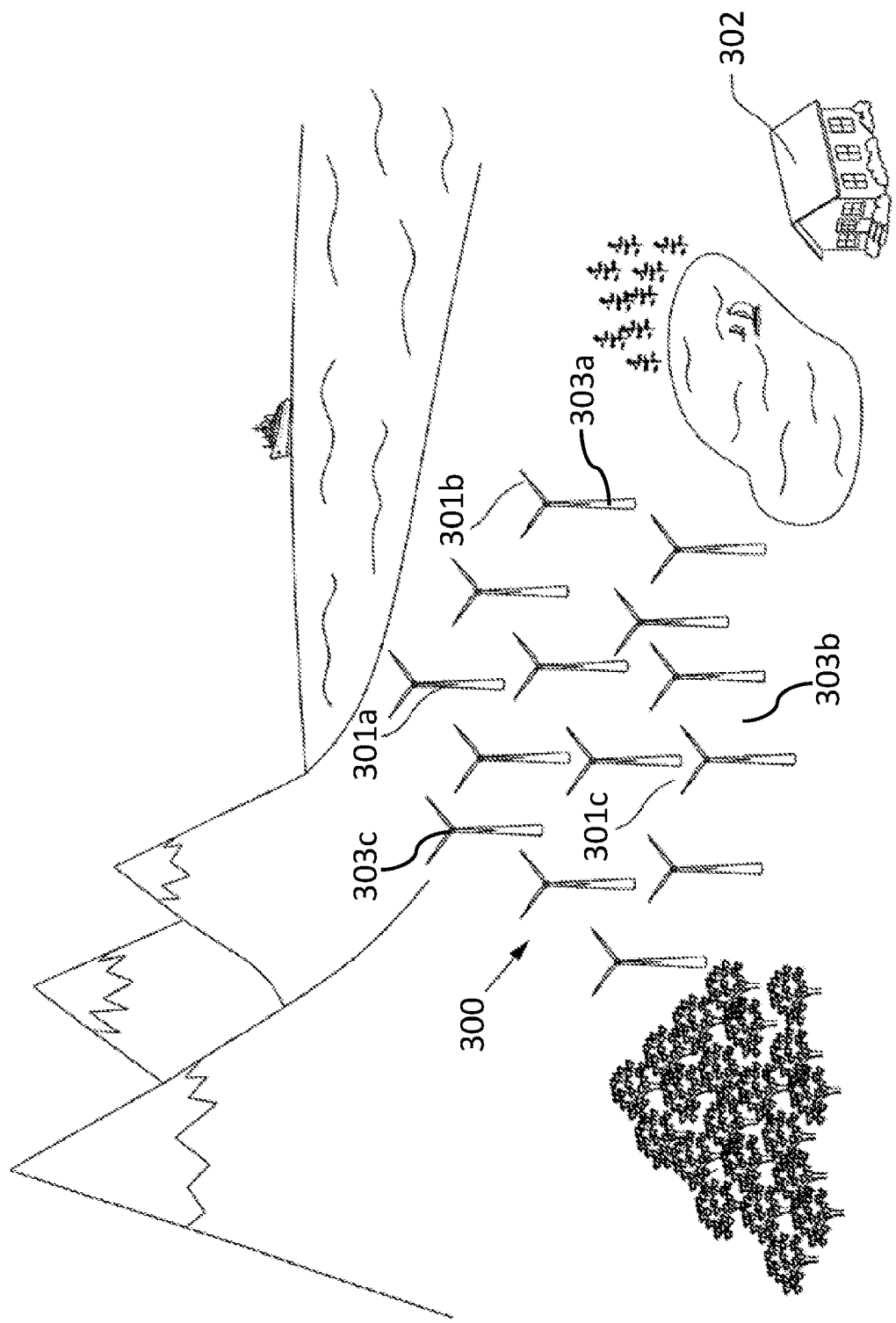
FIG. 3 illustrates a perspective view f a landscape with a wind power plant.

FIG. 3 illustrates a wind power plant (300) including a number of wind turbines (301a, 301b, 301c) and a neighbouring area (302), in which a third party resides. The wind power plant may comprise a single wind turbine, or may contain a plurality of wind turbines. The wind turbines may be any type of wind turbines known in the art.

Within the vicinity of the wind power plant, there are sensors (303a, 303b, 303c). There may be one sensor, or there may be a plurality of sensors. Some sensors may be of the same variety, or they may be of different varieties. Some sensors may monitor the same parameters, or they may monitor different parameters. Further, some sensors may be of the type of existing CMS sensors commonly used in the art, or they may be dedicated sensors for implementing a method according to an embodiment of the present invention, or they may be a combination of the two.

A Condition Monitoring System (CMS) is a system known in the art that is associated with one or more wind turbines (10). CMS systems use data from a variety of sensors to track wind turbine operating parameters and to monitor for possible component failure. In particular, a CMS system may monitor vibration levels of components of the wind turbine to predict possible component failure. Where this is the case, such vibration sensors may be used to provide vibration data for the present invention. Additionally or alternatively, one or more vibration sensors, or other types of sensor, that are not associated with a CMS may be used as explained.

The sensors used in embodiments provide data to a wind turbine or wind park monitoring system, such as a CMS, via one or more local networks, and the monitoring system records the sensor information. The monitoring system may perform analysis of the sensor data to reveal information on the operating parameters of the wind turbines, or it may send the information to a further computing system for subsequent analysis as appropriate.

Some of the sensors may be located on the body of the wind turbine, or inside the wind turbine, whereas some of the sensors may be located elsewhere, other than on the body of, or inside, the wind turbine. Some of the sensors may monitor parameters associated with a single wind turbine, some sensors may monitor parameters associated with a plurality of wind turbines. The sensors may record data continuously, at discreet intervals, or some combination of the two.

Figure 4:
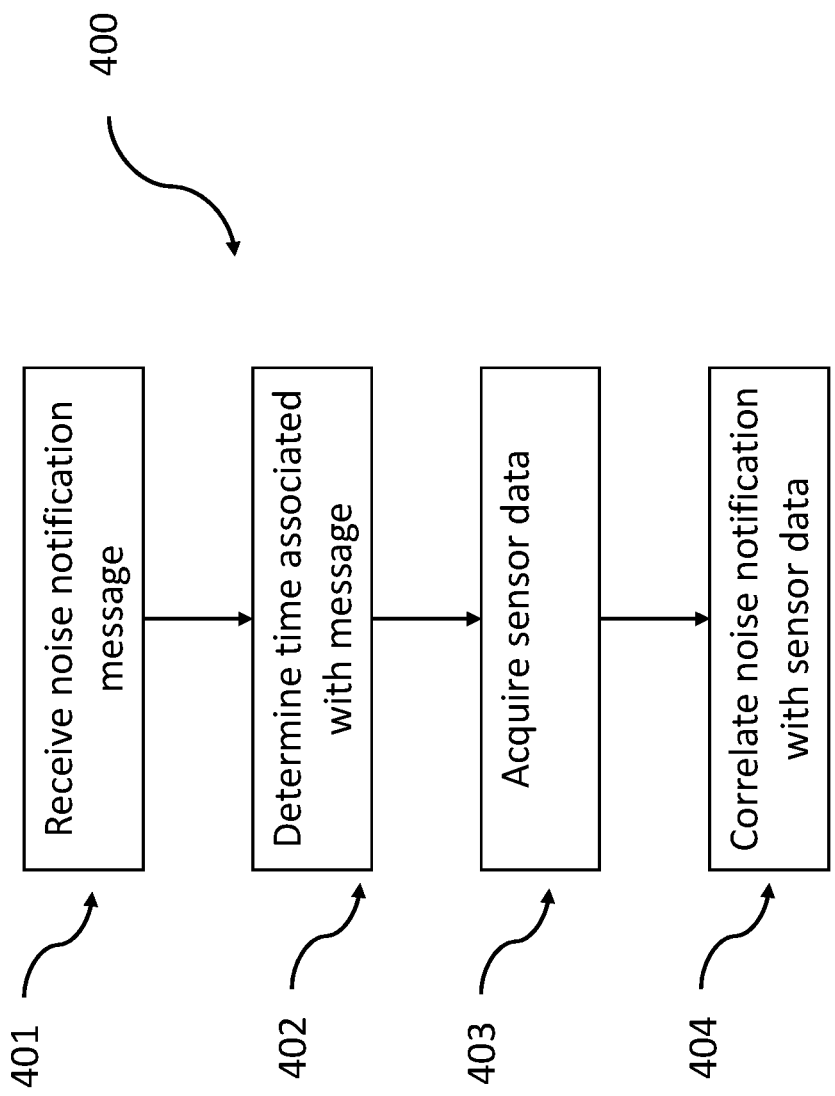
FIG. 4 is a flow chart illustrating a method of monitoring wind turbine tonal noise.

FIG. 4 is a flow diagram illustrating a method 400 of monitoring wind turbine noise according to an embodiment of the present invention. The method may be implemented using a wind turbine or wind park monitoring system, which may be located within the wind turbine or at a remote location.

In step 401, a noise notification is received. The noise notification is received as a message from a third party over a communications network. The message is sent from a communication device using a communications network external to the wind park management or monitoring system. The message therefore originates from outside the monitoring system network. The third party, who uses the communication device, will generally be within audible range of the wind turbine and is sending the message from outside of the wind turbine monitoring/management system network. Capability to receive such messages therefore provides a way of the system obtaining external information relevant to tonality.

Such a third party may be a member of the public, for example a neighbour who lives in the vicinity of the wind park. The noise notification message may for example be an SMS message. Alternatively, the message could take other forms, such as email, a phone call, instant messaging services and the like. Alternatively, the third party may send the noise notification message through a web or mobile app. The app could automatically generate time and location information.

The message is used by the third party to indicate when the volume of a wind turbine, or wind park, is too great. The message essentially provides third parties with a communication link to complain about the turbine/park noise levels. However, the inventors have appreciated that such complaints can be assumed to be indicative of when tonal noise is occurring because it is tonal noise to which the human ear is most sensitive, as compared to broadband noise. Therefore such messages can provide a useful indication of when tonal noise is occurring.

Generally, the message may be sent to dedicated receiving means, such as a communications module of the monitoring system. A dedicated identifier or address for the receiving means can be provided, such as a dedicated telephone number, email address, or network address. The dedicated identifier may be specific to a given wind park, with various wind parks having different identifies. This allows the message to be associated with a particular wind park. Other mechanisms for associating a particular message with a particular wind park are possible based on location information, as explained below.

In step 402, a time associated with the message is determined. This may be the time the message was received, the time the message was sent, a time indicated within the message content, or some other time indicative of when the third party heard tonal noise.

In step 403, sensor data is acquired from at least one sensor, the sensor data being indicative of at least one operating parameter of at least one wind turbine. The at least one sensor may include a vibration sensor, a sensor that senses rotor RPM, a sensor that senses blade pitch, a wind speed sensor, a wind direction sensor, and any other sensor that can be used to measure appropriate operating parameters and conditions of at least one wind turbine. The sensor data may correspondingly be vibration data, rotor RPM data, blade pitch data, wind speed data, wind direction data, or any other data collected by the sensors that can be used to indicate turbine operating parameters. The data may be acquired continuously or at discreet time intervals, or a mixture of continuously and discreetly.

The at least one sensor may be located on a wind turbine itself, for example on the tower or the nacelle, or located apart from the at least one wind turbine. For example, a separate weather station may monitor wind speed and direction. The at least one sensor may include sensors associated with a single wind turbine, a plurality of wind turbines, or some combination of the two. Further, the sensors may be the CMS sensors commonly used in the art, dedicated sensors for implementing embodiments, or a combination of the two.

In step 404, the noise notification is correlated with the acquired sensor data based on the time associated with the message, such that acquired sensor data relating to the determined time associated with the noise notification message is obtained.

Temporally correlating the message with the acquired sensor data allows a determination of wind turbine operating parameters that can lead to tonal noise. In addition, or alternatively, it allows a determination of whether the message was triggered by the third party hearing tonal noise, or if another source was likely responsible to the noise level heard by the user. Examples of these methods will be described below.

Figure 5:
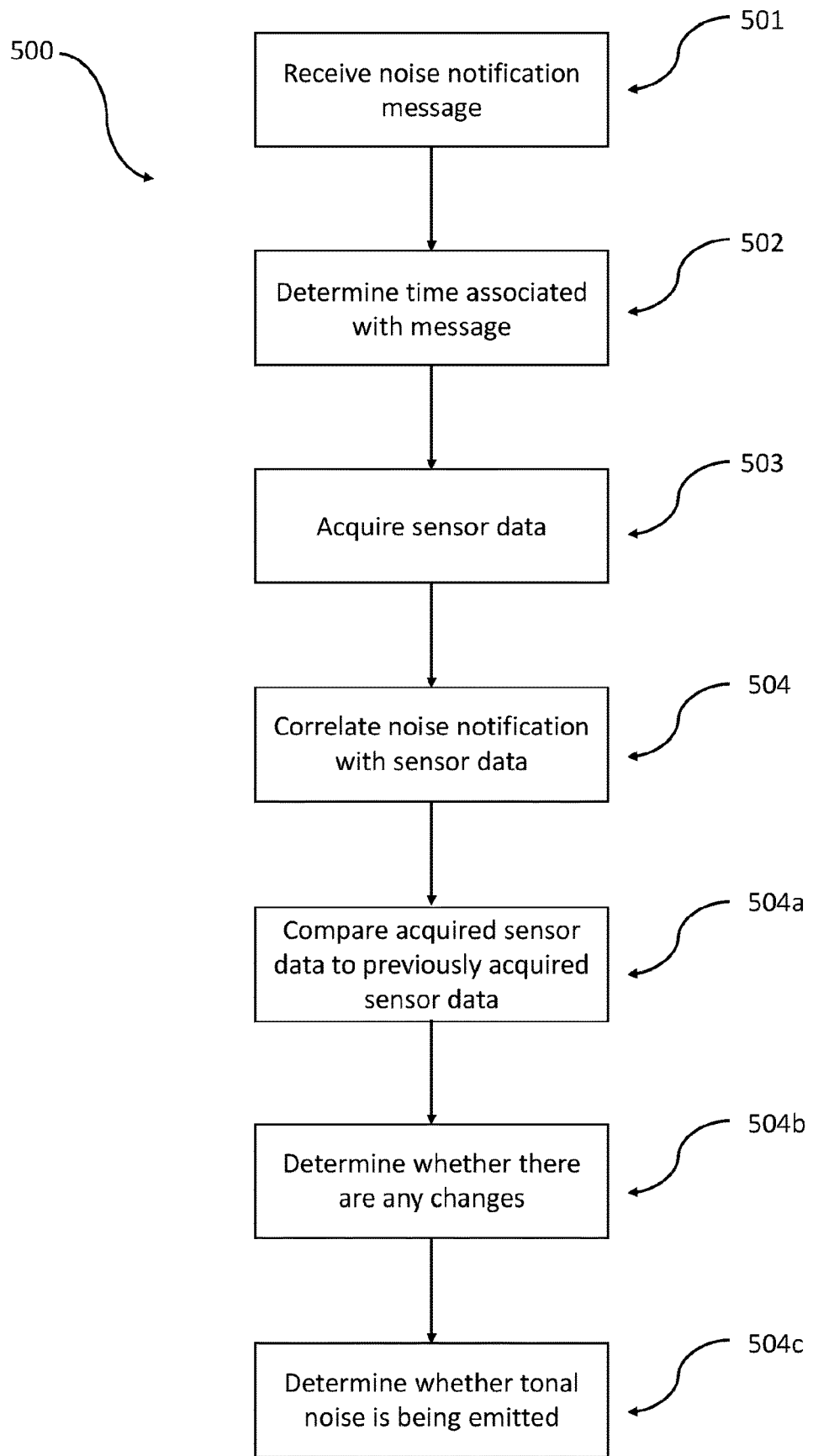
FIG. 5 is a flow chart illustrating a further method of monitoring wind turbine tonal noise.

FIG. 5 is a flow diagram illustrating a method 500 according to another embodiment of the present invention. The steps 501 to 504 correspond to the steps 401 to 404 in FIG. 4, and are described in detail above.

Figure 5A:
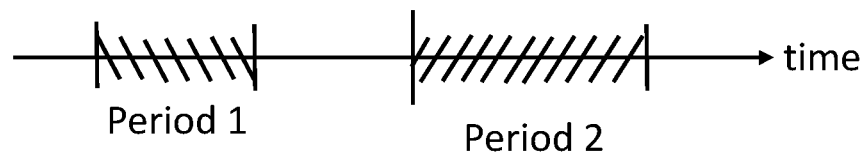
Figure 5B:
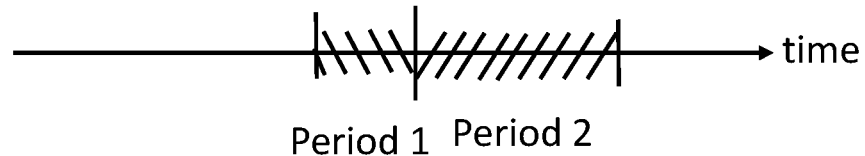

In the step 504a, acquired sensor data corresponding to the time associated with the message, determined in step 502, is compared to previously acquired sensor data. The previously acquired sensor data is associated with a period of time during which no messages were received, or with a period of time for which it is otherwise known that no tonal noise was being emitted by the turbine/wind park. For example, the previously acquired sensor data may be acquired prior to receiving the message. The sensor data may have been acquired over a given window of time, the window of time ending more than a predetermined period of time before the time associated with the message. In FIG. 5a, the previously acquired sensor data may have been acquired during period 1, while the sensor data acquired in response to the noise notification message may have been acquired during period 2. There is a temporal gap between period 1 and the noise notification message being received, which marks the beginning of period 2. Alternatively, the previously acquired sensor data may comprise data acquired just prior to the time associated with the message, between a predetermined time before the time associated with the message and the time associated with the message. In FIG. 5b, the previously acquired sensor data may have been acquired during period 1, while the sensor data acquired in response to the noise notification message may have been acquired during period 2. Period 1 ends at the same time period 2 begins, namely when the noise notification message is received. Alternatively the previously acquired sensor data may have been acquired during a time period chosen by an operator.

In step 504b, it is determined whether there are any changes in the acquired sensor data, relative to the previously acquired sensor data, Such changes may include an increase in wind speed, a change in blade rotor pitch, a decrease in rotor RPM or any other change in the data measured by one of the at least one sensors.

In step 504c, it is determined, based upon any changes in the acquired sensor data as determined in step 504b, whether tonal noise is being generated by the at least one wind turbine. It may be the case that if the at least one wind turbine was known to not be emitting tonal noise at a first time before the time associated with the noise notification message, and it is determined in step 504b that there has been a change in the acquired sensor data since this first time, then it may be determined that the at least one wind turbine is now emitting tonal noise. Alternatively, if in step 504b it is determined that there is no change in the acquired sensor data, it may be determined that the at least one wind turbine is not emitting tonal noise. In this case, it may be concluded that the noise that resulted in the third party sending the noise notification message arose from a different source, such as a nearby passing vehicle. The message may then be discounted as an indicator of tonal noise in further analysis.

Figure 6:
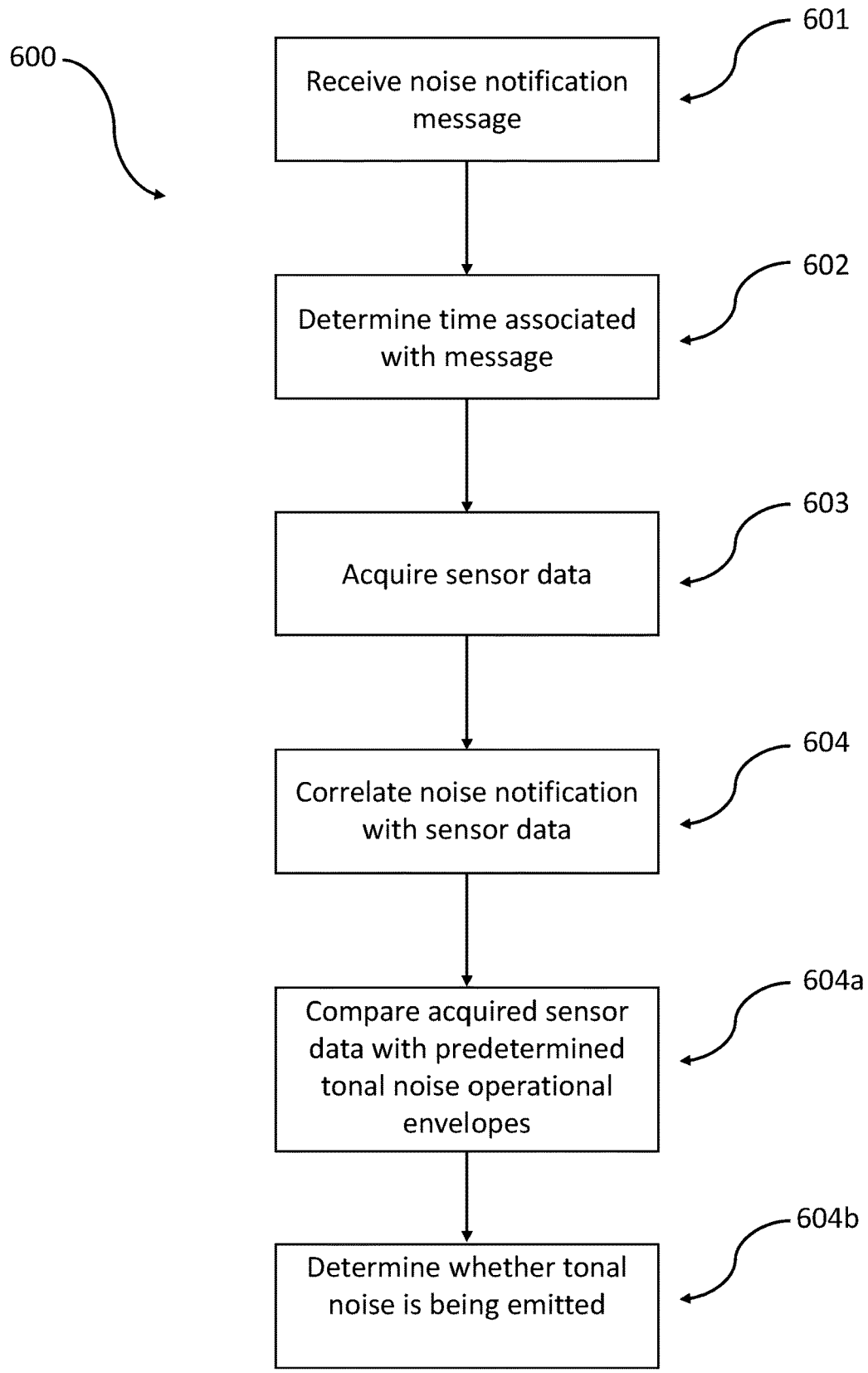
FIG. 6 is a flow chart illustrating a further method of monitoring wind turbine tonal noise.

FIG. 6 is a flow diagram illustrating a method 600 according to yet another embodiment of the present invention. The steps 601 to 604 correspond to the steps 401 to 404 in FIG. 4, which are described above.

In step 604a, acquired sensor data is compared with one or more predetermined tonal noise operational envelopes for the one or more wind turbines. The operational envelopes correspond to a range of operating parameters that are known to cause the emission of tonal noises by the at least one turbine. Such ranges may be based upon empirical data gathered by prior measurement of parameters of turbines emitting tonal noise, or upon computer models or simulations.

In step 604b, it is determined, based upon the comparison in step 604a, whether the at least one wind turbine is emitting tonal noise, and hence whether the noise notification corresponds to tonal noise being generated by the at least one wind turbine. If at least one of the at least one wind turbines is operating within a tonal noise operational envelope, it may be determined that the wind turbine is emitting tonal noise. Alternatively, if none of the at least one wind turbines are operating within a tonal noise operational envelope then it may be determined that the at least one wind turbine is not emitting tonal noise. In this case, it may be concluded that the noise that resulted in the third party sending the noise notification message arose from a different source, such as a nearby passing vehicle.

According to an additional aspect of the invention, which may be combined with the method of FIG. 6 (with or without step 604b), or with any other aspects of the invention, the turbine, turbine controller, or wind park controller, is configured to send a message, or log information, when it is determined that the given wind turbine could be emitting tonal noise based on the predetermined tonal noise operational curves and thresholds (the operational envelopes). In particular, acquired sensor data can be compared with one or more predetermined tonal noise operational envelopes for the one or more wind turbines, as in step 604a. The operational envelopes correspond to a range of operating parameters that are known to cause the emission of tonal noises by a turbine. In response to determining whether or not the wind turbine is operating within an operational envelope corresponding to the output of tonal noise, a message is sent identifying the wind turbine and a time associated with the message, to the monitoring/control computer system upon which the methods described herein are being implemented. The message is then correlated with any other messages received from third parties, based upon the time associated with the messages, using any of the correlating techniques described herein. Optionally, correlation is determined based upon whether the message indicating potential tonal noise based upon turbine operating parameters was received within a predetermined period of time of a predetermined number of third party messages. In some implementations the message may optionally be in the form of logged data that is passed to the system; in other implementations the system may optionally be combined with the CMS or similar and may be configured to log this information instead of receiving it via a message. This aspect could be used as an initial check to identify a potentially annoying turbine, which would be indicated if there is an overlap between a predetermined number of third party messages and the message associated with the turbine itself. As well as providing the identity of potentially tonal noise emitting turbines, this aspect may be used as a filter to determine whether further steps described herein are implemented, since if there is no indication of tonal operating conditions being experienced by any turbine, further steps such as logging a tonal event or controlling one or more turbines may not be implemented.

It is noted that the method steps of FIGS. 5 and 6 may be combined such that both the method described in FIG. 5 and in FIG. 6 may be used in combination to determine whether at least one wind turbine is emitting tonal noise. In this case it may be determined that the at least one wind turbine is emitting tonal noise only if both a change has been detected in step 504*b* for at least one wind turbine, and the at least one wind turbine for which a change is detected is also found to be operating within a tonal noise operational envelope in step 604*b*. Alternatively, it may be satisfactory to determine that at least one wind turbine is emitting tonal noise based upon either determining that there is a change for at least one wind turbine in step 504*b*, or determining that at least one wind turbine is operating within a tonal noise operational envelope.

Alternatively, or in addition, to the above criteria described in relation for FIGS. 5 and 6 other criteria may be used to determine if tonal noise is being emitted. For example, if multiple noise notification messages are received, this may increase the confidence that the one or more wind turbines are emitting tonal noise. Therefore, if a certain number of messages, above a predetermined threshold, are received within a predetermined period of time, the emission of tonal noise can be determined as a result. The predetermined period of time may be calculated from receipt of a first message, and may span a period of time equivalent to the amount of time for which a turbine would normally emit tonal noise, for example, less than 1 hour, less than 30 minutes, less than 20 minutes, less than 10 minutes, or less than 5 minutes.

In addition, or as an alternative, the number of messages received in a particular period of time may be used to determine how many additional criteria are required to be met for a determination of tonal noise to be made. For example, if a number of messages below a first predetermined threshold are received in a predetermined period of time, then both a change for at least one wind turbine according to step 504*b* and the at least one wind turbine operating within a tonal noise operational envelope according to step 604*b* may be required. For example, the requirement for both criteria to apply may be between 0 and 3 noise notification messages received within a predetermined period of time as described above. However, if more messages than the first predetermined threshold are received within the predetermined period of time, then both criteria may not need to be satisfied, one or the other may suffice. Further, it may be that if a number of noise notification messages above a second predetermined threshold, greater than the first, have been received in the predetermined period of time, that no other criteria need to be satisfied in order for it to be determined that at least one wind turbine is emitting tonal noise.

In another aspect, which may be combined with any other aspect described herein, the at least one turbine comprises two or more turbines. These turbines may be located in the vicinity of each other. The at least one sensor may monitor an individual wind turbine, or monitor a plurality of turbines. By performing the method of FIG. 5, FIG. 6, or a combination of both the method of FIG. 5 and FIG. 6, it may be determined which of the at least two wind turbines are emitting tonal noise. For example, it may be determined that only one wind turbine is emitting tonal noise, or it may be determined that a plurality of the wind turbines are emitting tonal noise.

In another aspect, which may be combined with any other aspect described herein, one or more of the at least one sensors may only enter into a data acquiring state when a noise notification message is received. Prior to the receiving of the noise notification message, one or more of the sensors may be powered off, in a standby or low-power state, or fully active but not acquiring data. This may be the case where the sensors are dedicated sensors and not a part of a standard CMS system known in the art. Other sensors may be in a data acquiring state continually, and may be part of a standard CMS system, and may compliment any dedicated sensors. Upon the receiving of the message, one or more sensors may enter into a data acquiring state for a predetermined period of time. Alternatively, one or more sensors may enter into a data acquiring state until instructed otherwise. This instruction may come in the form of input from a wind turbine or wind park operator, or alternatively as a further message from a third party stating that the tonal noise has stopped.

Figure 7:
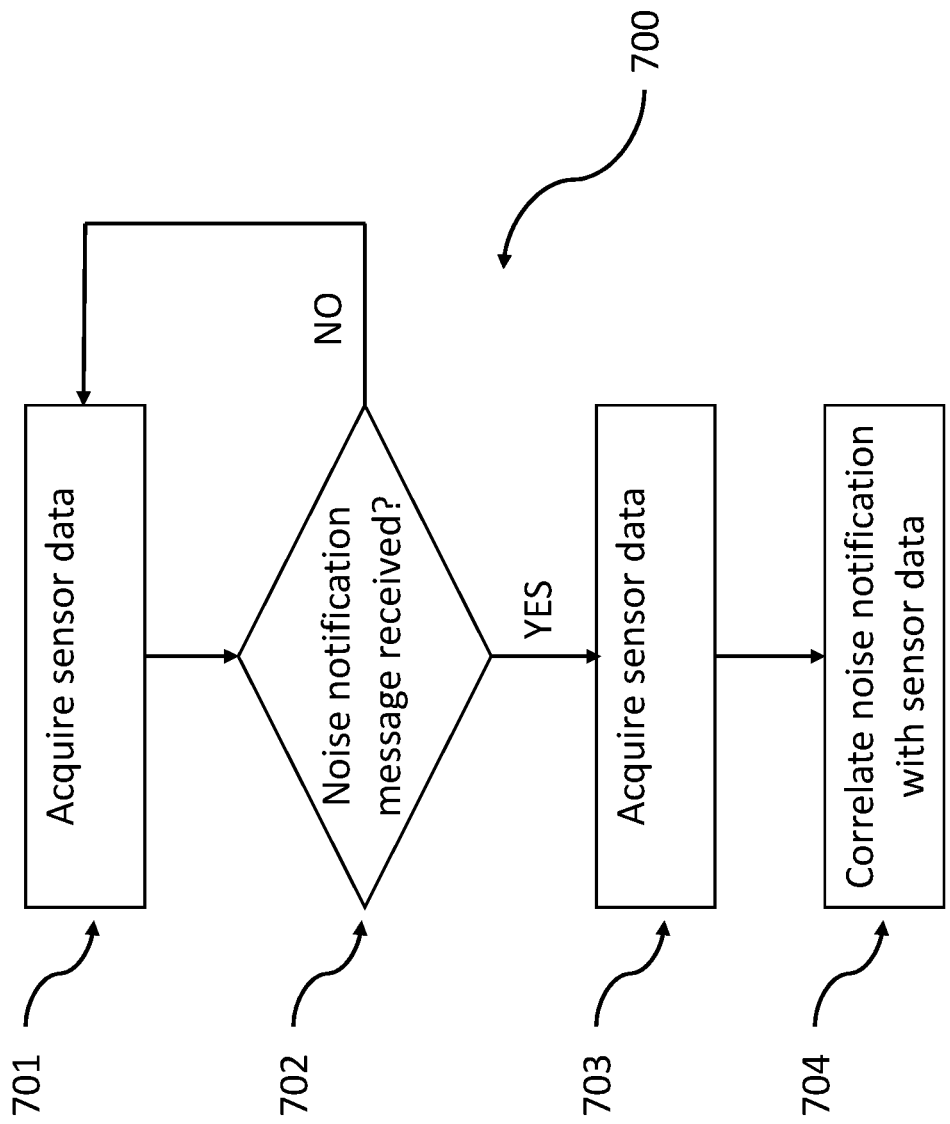
FIG. 7 is a flow chart illustrating a method of acquiring sensor data.

FIG. 7 is a flow chart which illustrates an alternative aspect to the one described in the preceding paragraph and involves one or more of the at least one sensors always operating in a data acquiring state.

In step 701 of method 700, at least one sensor acquires sensor data which is stored temporarily. In step 702, if no noise notification message is received, the at least one sensor continues to acquire sensor data which is stored temporarily. Alternatively, if a noise notification message is received, the method progresses to step 703, and the acquired sensor data relating to a period of time before the time associated with the message is stored. The period of time may be predetermined, or alternatively it may be set by an operator on a case by case basis.

In order to save memory, it may be the case that the data acquired from the sensors is saved over old data. This may be done in such a way that the overwritten data must be older than a predetermined amount of time. In particular, the overwritten data may need to have been originally received/written more than a predetermined period of time before the present time. In other words, the data to be overwritten must have been received and/or written prior to the period 1 identified in FIG. 5*a*, or in FIG. 5*b*. For example, if, upon the reception of a noise notification message, data is stored from five minutes before the time associated with message, then the overwritten data should be older than five minutes. In this way, data which may still be wanted is not overwritten. In the example of FIG. 5*b*, the predetermined period of time would correspond to period 1. Thus, in this example, data older than a length of time equal to period 1 may be overwritten.

Alternatively, should no noise notification message be received it may be the case that sensor data relating to a time earlier to the predetermined time period is simply deleted.

Further, the optional step 704 may also be performed. In this step, data relating to a period of time after the time associated with the noise notification message is stored. The period of time may be predetermined, or may be set by an operator on a case by case basis.

According to an aspect, which may be combined with any of the aspects described herein, the noise notification message may contain location information indicating the location from which the third party can hear the tonal noise. This location information may be located in the content of the message, or it may be associated with a particular third party. Further, location information may be stored in the message metadata. The location information may be in the form of GPS coordinates. Alternatively, the location information may be contained within a separate message, which may be sent at a different time to the noise notification method.

Described above are a number of embodiments with various optional features. It should be appreciated that, with the exception of any mutually exclusive features, any combination of one or more optional features are possible.

According to any embodiments or aspects of the invention as described herein, the one or more wind turbines may be controlled based upon a determination that tonal noise is being emitted, as determined by the methods described herein. The wind turbines may be controlled to avoid tonal noise production. The wind turbines are controlled by a wind turbine controller that is associated with one or more than one wind turbine of a wind power plant. Steps of the method may take place in the controller, or may be split between the controller and one or more computers that are in communication with the controller. The wind turbines may be controlled by adjusting wind turbine operating parameters to take the wind turbine out of a tonal noise emitting operational envelope. The parameters adjusted may comprise one or more of RPM, power output and blade pitch angle.

Any embodiments may be implemented as one or more computer programs executing on one or more processors. The methods may takes place in one or more computers, which may be internal or external to a wind power plant, and may be associated with one or more than one wind turbine. The one or more computers may be a controller for controlling a wind turbine or wind power plant, or may be in communication with a controller for controlling a wind turbine or wind power plant.

While embodiments of the invention have been shown and described, it will be understood that such embodiments are described by way of example only and it will be appreciated that features of different embodiments may be combined with one another. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

The invention claimed is:

1. A method of monitoring wind turbine tonal noise, the method comprising:
   acquiring first sensor data from a sensor, the first sensor data being indicative of an operating parameter of a wind turbine;
   after acquiring the first sensor data, receiving, over a communications network, a noise notification from a third party;
   in response to the noise notification, acquiring second sensor data from the sensor, the second sensor data being indicative of the operating parameter of the wind turbine;
   comparing the first sensor data with the second sensor data to determine that the wind turbine was emitting tonal noise when the noise notification was received; and
   in response to determining that the wind turbine was emitting tonal noise, adjusting an operating parameter of the wind turbine to reduce the emitted tonal noise.

2. The method of claim 1, further comprising:
   determining, based on comparing the second sensor data with one or more predetermined tonal noise operational envelopes for the wind turbine, that the wind turbine was emitting tonal noise, wherein the one or more operational envelopes correspond to a range of operating parameters that cause the wind turbine to emit tonal noise.

3. The method of claim 1, wherein the sensor enters a data acquiring state for a pre-determined period of time upon receiving the noise notification.

4. The method of claim 1, wherein sensor data is acquired continually prior to receiving the noise notification; and
   wherein, in response to the noise notification, the first sensor data relating to a pre-determined time period before the noise notification was received is stored.

5. The method of claim 1 wherein the first sensor data is acquired and stored for a pre-determined period of time after the noise notification is received.

6. The method of claim 1, wherein the noise notification contains location information relating to a location from which the noise notification was sent.

7. The method of claim 1, wherein the noise notification is an SMS message or message over internet.

8. The method of claim 1, wherein the noise notification is sent via a mobile or web app.

9. The method of claim 1, wherein the sensor includes a vibration sensor, and the first sensor data includes vibration data.

10. The method of claim 1, wherein the at sensor senses rotor RPM, and the first sensor data includes rotor RPM data.

11. The method of claim 1, wherein the sensor senses blade pitch, and the first sensor data includes blade pitch data.

12. The method of claim 1, wherein the sensor senses turbine power, and the first sensor data includes turbine power production.

13. The method of claim 1, wherein the sensor includes a wind speed sensor, and the first sensor data includes wind speed data.

14. The method of claim 1, wherein the sensor includes a wind direction sensor, and the first sensor data includes wind direction data.

15. The method of claim 1, further comprising, in response to determining that the wind turbine was emitting tonal noise, adjusting an operating parameter of the wind turbine to mask the emitted tonal noise.

16. The method of claim 1, further comprising:
   comparing the second sensor data with one or more predetermined tonal noise operational envelopes for the wind turbine, the one or more operational envelopes correspond to a range of operating parameters that cause the wind turbine to emit tonal noise; and
   when it is determined that the wind turbine is operating within one of the predetermined tonal noise operational envelopes, determining information indicative of a time associated with operation of the wind turbine within the one of the predetermined tonal noise operational envelopes and correlating the information with one or more received third party messages.

17. A controller for controlling a wind turbine or a wind power plant, the controller comprising:
   an input/output interface configured to:
      receive first sensor data indicative of an operating parameter of a wind turbine;
      after receiving the first sensor data, receive a noise notification from a third party;
      response to the noise notification, receive second sensor data indicative of the operating parameter of the wind turbine; and
   one or more processors programmed to perform an operation, comprising:
      comparing the first sensor data with the second sensor data to determine that the wind turbine was emitting tonal noise when the noise notification was received; and
      in response to determining that the wind turbine was emitting tonal noise, adjusting an operating parameter of the wind turbine to reduce the emitted tonal noise.

18. A system comprising:

an input configured to receive first sensor data from a sensor, the first sensor data being indicative of an operating parameter of a wind turbine;

a receiver configured to receive a noise notification after acquiring the first sensor data, wherein the input is further configured to receive, in response to the noise notification, second sensor data from the sensor, the second sensor data being indicative of the operating parameter of the wind turbine; and a computing device configured to:

compare the first sensor data with the second sensor data to determine that the wind turbine was emitting tonal noise when the noise notification was received; and in response to determining that the wind turbine was emitting tonal noise, adjust an operating parameter of the wind turbine to reduce the emitted tonal noise.

19. A wind turbine, comprising:

a tower;

a nacelle disposed on the tower;

an input configured to receive first sensor data from a sensor, the first sensor data being indicative of an operating parameter of the wind turbine;

a receiver configured to receive a noise notification after acquiring the first sensor data, wherein the input is further configured to receive, in response to the noise notification, second sensor data from the sensor, the second sensor data being indicative of the operating parameter of the wind turbine; and a computing device configured to:

compare the first sensor data with the second sensor data to determine that the wind turbine was emitting tonal noise when the noise notification was received; and in response to determining that the wind turbine was emitting tonal noise, adjust an operating parameter of the wind turbine to reduce the emitted tonal noise.

* * * * *